United States Patent [19]

De Thomas

[11] Patent Number: 4,795,733

[45] Date of Patent: Jan. 3, 1989

[54] HYDROGENATION CATALYST AND PROCESS FOR ITS PREPARATION

[75] Inventor: Waldo De Thomas, Parsippany, N.J.

[73] Assignee: GAF Corporation, Wayne, N.J.

[21] Appl. No.: 125,955

[22] Filed: Nov. 27, 1987

[51] Int. Cl.$^4$ .................. B01J 21/04; B01J 23/64; B01J 23/89

[52] U.S. Cl. ..................... 502/327; 502/326

[58] Field of Search ............... 502/326, 327; 568/861

[56] References Cited

U.S. PATENT DOCUMENTS 3,759,845  9/1973  Rudoff et al. ............. 502/324
4,171,287 10/1979  Keith ...................... 502/327 X

*Primary Examiner*—W. J. Shine
*Attorney, Agent, or Firm*—Marilyn J. Maue; Joshua J. Ward

[57] ABSTRACT

The invention relates to a novel supported catalyst comprising a combination of metals with nickel as component (a), a metal having an atomic number greater than 43 from Group VIII of the Periodic Table as component (b) and rhenium as component (c) in a weight ratio of (a):(b):(c) of about 10–90:0.05–5:0.03–10 and to the use of the catalyst for high pressure hydrogenation reactions, particularly for the hydrogenation of butanediol product containing aldehyde, butynediol and color forming impurities.

13 Claims, No Drawings

HYDROGENATION CATALYST AND PROCESS FOR ITS PREPARATION

In one aspect the invention relates to a novel hydrogenation catalyst and to a method for its preparation.

In another aspect the invention relates to the use of said catalyst in hydrogenation reactions.

BACKGROUND OF THE INVENTION

Glycols such as 1,4-butanediol and 1,6-hexanediol are useful as monomers in a number of polymers including, thermoplastics such as the polyester thermoplastics and polyether thermoplastics. Examples of such thermoplastics include poly(1,4-butylene terephthalate) resin block copolymers containing blocks of poly(butyl ether) and aliphatic polyesters such as poly(hexylene adipate)

The glycol products also find wide application in pharmaceutical and cosmetic uses where the degree of purity and color is of prime consideration. A common method for preparing glycols has involved the hydrogenation of a butynediol in the presence of a nickel/copper/manganese catalyst at a pressure between about 300 and about 2000. However, this process results in a product significantly contaminated with aldehydes, alkene diols and color forming impurities which are particularly objectionable when the product is employed as an adduct in cosmetic and pharmaceutical formulations. Alkene diols and acid aldehydes are particularly troublesome because of their well known skin irritating properties. Also, the presence of low boiling aldehydes lowers the stability of the product on storage. Accordingly, improved methods for the preparation of glycols in a more purified state has been the subject of current research projects. Many catalyst combinations, such as those discussed in the following patents, have been employed to achieve this end.

Of particular interest in the background of the present invention is the catalytic conversion 1,4-butynediol to 1,4-butanediol as described in U.S. Pat. No. 3,759,845 entitled CATALYST FOR PREPARING 1,4-BUTANEDIOL. This patent discloses a nickel/copper/manganese on alumina hydrogenation catalyst which has improved stability and longer life than catalysts previously employed in similar reactons.

Another process for the conversion of 1,4-butynediol to 1,4-butanediol is described in U.S. Pat. No. 3,449,445 to Wetherill. The process described therein comprises a partial hydrogenation of a pretreated aqueous solution of 1,4-butynediol of about 35% to 40% concentration from which formaldehyde has been removed by the procedure described in U.S. Pat. No. 2,993,708, at a pH of 6.5 to about 7.5. The solution is fed to a low pressure reactor containing a Raney-type nickel catalyst of the type described in U.S. Pat. No. 1,638,190, which is readily prepared by treating an aluminum alloy with caustic soda to dissolve out the aluminum and leave the nickel in a highly divided form. After the 1,4-butynediol solution is charged, the reactor is maintained at a temperature of from about 50° to about 150° C. and under a hydrogen pressure of 200 and 300 psig. until the desired partial hydrogenation of the 1,4-butynediol is achieved as determined by the cessation of hydrogen absorption.

The reaction mixture is allowed to settle and the partially hydrogenated product is separated from the catalyst and charged to an intermediate storage zone for pumping into the subsequent high pressure portion of the process. From the intermediate storage zone, the partially hydrogenated solution is charged to a high pressure reactor maintained at about 2,000 to about 3,000 psig at a temperature of about 120° to 140° C. A stream of hydrogen is simultaneously charged under pressure to the reactor. The reactor is filled with a fixed bed of catalyst comprising about 12 to 17% by weight of nickel, 4 to 8% by weight of copper and 0.3 to 1.0% by weight of manganese supported on a silica gel carrier.

The hydrogenated liquid product is separated from the residual hydrogen which is recycled together with make-up hydrogen and returned to the reactor. The separated liquid product is then cooled to about room temperature and charged to a storage tank. The product so obtained can then be subjected to distillation to recover 1,4-butanediol product. It has been found, however, that the silica gel carriers employed as the catalyst supports in the high pressure reactors of the above-described processes physically degrade under the process conditions resulting in the production of fines which cause pressure fluctuations in the high pressure reactor. These pressure fluctuations result in intermittent shut-downs, high catalyst replacement costs and consequent loss of production.

Accordingly, it is an object of the present invention to provide an improved hydrogenation catalyst system which overcomes the deficiencies of the above hydrogenation processes while exhibiting longer life and higher activity resulting in longer productivity and improved process economics.

Another object of this invention is to provide an improved catalyst for the hydrogenation of compounds containing carbon to carbon unsaturation or a carbonyl group.

It is another object of the present invention to provide an improved hydrogenation process for the conversion of 1,4-butynediol to 1,4-butanediol in high yields and selectivity.

It is another object of the present invention to provide a highly active hydrogenation catalyst which can be prepared by an economical and commercially feasible process.

These and other objects of the invention will become apparent from the following description and disclosure.

THE INVENTION

In accordance with this invention there is provided a highly active hydrogenation catalyst of (a) nickel, (b) a metal having an atomic number greater than 43 selected from Group VIII of the Periodic Table and (c) rhenium combined in a weight ratio of between about 10 and about 90 wt. % of metallic nickel, between about 0.05 and about 5 wt. % of (b) and between about 0.03 and about 10 wt. % of metallic rhenium; the most preferred weight ratio being between about 12 and about 25 wt. % nickel to between about 0.09 and about 0.6 wt. % (b) to between about 0.09 and about 0.6 wt. % rhenium. The remaining amount of the catalyst, composition, e.g. about 5% to about 90% of the composition, represents the support on which the metals are deposited. Suitable supports include carbon, magnesium silicate, bentonite, zeolite, metal alloys, silica- alumina and magnesium oxide-silicon oxide mixtures. The most preferred support for the present catalyst system is γ-alumina fluted form although any crystalline high surface form can be employed. The metals of Group VIII as component (b) of the above named catalyst are the metals selected from the group consisting of ruthenium, rhodium, platinum, palladium and mixtures thereof; palladium and rhodium being preferred and palladium being most preferred.

The catalyst material of the present invention can be conveniently prepared by absorbing the nitrate, acetate or carbonate salt of nickel in aqueous solution, e.g. a 40-80% aqueous solution, on the support material in an amount within the above prescribed range. This may be accomplished by dipping or otherwise contacting the support in the form of granules, powder or fluted extruded shape with the aqueous solution at a temperature of between about 32° C. and about 100° C. under atmospheric pressure followed by drying the impregnated support at a moderate temperature, e.g. 110° C.-150° C., and then calcining the dried product at 350° C.-475° C. for about 10 to about 20 hours, preferably 12 to 15 hours, to convert the nickel salts to oxides. The absorption step can be accomplished in one or more stages to arrive at a nickel concentration within the above range. For example, when a plurality of absorption steps are employed, the support may be immersed in the aqueous solution for a short period, e.g. 0.5 to 10 minutes with agitation, after which the unabsorbed solution is decanted and the impregnated support dried by moderate heating to drive off water. The decanted solution is then employed to rewet the initially impregnated support for additional absorption of nickel salt and again dried. These immersion, decanting and drying steps can be repeated as many times as required to provide the desired content of nickel before calcining the nickel impregnated support.

The calcined, supported nickel oxide is then contacted with an aqueous solution of metal component (b) nitrate, acetate or carbonate and perrhenic acid, rhenium oxide or rhenium acetate containing proportions of component (b) and rhenium suitable to provide concentrations of these metals within the above catalyst ranges. The absorption of the component (b) and rhenium can be effected separately or in admixture in one or more stages as by the procedure described above.

After the amount of metals desired in the final product have been absorbed and dried on the support, the composition is calcined as described above, whereby oxides of the respective metals are obtained.

The product is recovered in discrete particles such as granules, dust or powder which can be formed into tablets or hollow or solid core extruded fluted shapes or any other convenient form, depending on the support selected, by conventional procedures. The metal salts can be deposited on the support sequentially with drying and calcining between each addition if desired for closer control of the catalyst composition. Sintering of the catalyst is to be avoided; accordingly, the upper calcination temperature is critical for maintaining high catalyst activity.

The catalyst prepared in the above manner, is then reduced for suitable use in the hydrogenation of alkynediols to the corresponding alkanediols, the hydrogenation of esters to alcohols or aldehydes to alcohols, olefins to alkanes, acetylenes to olefins and alkanes, or the hydrogen saturation of other carbonyl containing compounds or olefinically or acetylenically unsaturated compounds. The most preferred hydrogenation reaction involves the reduction of butenediol in admixture with butanediol, hydroxybutyraldehyde and small amounts of butynediol and color impurities, such as the mixtures obtained from the partial hydrogenation of butynediol at relatively low temperatures and pressures e.g. 50°-60° C. under 200-300 psig.

To prevent reversion of the metal components in the catalyst to oxides, it is preferred that the reduction of catalyst oxides be effected imminent to their use in the high pressure hydrogenation reactions or reduced in situ during the hydrogenation of the organic compound. Separate catalyst reduction is efficiently carried out at a temperature of between about 150° C. and about 350° C., over a period of from about 5 to about 12 hours by contacting the supported or unsupported metal oxide compositions with gradually increasing amounts of hydrogen at incrementally increasing temperatures. Since the reaction is highly exothermic, heat in the reduction zone is controlled by initial dilution of the hydrogen with an inert gas such as nitrogen, helium, argon, neon, etc. Initial contact with reducing gas can be effected with as little as 0.5% hydrogen in diluent at a temperature of between about 175° and about 210° C.; although hydrogen dilution to between about 1% and 10% for initial contact is recommended. Generally, the higher the concentration of the nickel component, the greater the dilution of hydrogen to control the exotherm. In a preferred embodiment, after about 0.5 to about 2 hours contact with 1% hydrogen at about 180°-200° C., the hydrogen concentration is increased and the temperature is raised to about 250° C. where it is held for an additional 0.5 to 2 hours. Finally, the temperature is raised to about 300° C. and the solids contacted with hydrogen for an additional 4 to 8 hours until substantially all of the metal oxides, e.g. the oxides of Ni, Pd and Re, are converted to the metallic state. During this operation, the concentration of hydrogen is gradually increased to 100% and the oxides are decomposed to leave the metals in their nascent state absorbed on the support. Catalysts generally having a surface area of from about 10 to about 250 cm$^3$/g are suitably employed, although those having a surface area of from about 30 to about 175 m$^2$/g and a pore volume of from about 0.2 to about 1.2 cm$^3$/g are most preferred. The catalyst in this reduced state is then suitably introduced into the hydrogenation zone for conversion of the organic feed materials.

The conversion of alkynediols or partially hydrogenated alkynediols to alkanediols, particularly 1,4-butynediol to 1,4-butenediol and 1,4-butanediol or 1,4-butenediol to 1,4-butanediol, is accomplished according to the teachings of U.S. Pat. Nos. 3,759,845, (particularly at columns 2, 5 and 6) and 3,449,445 in which the present catalyst is substituted, which teachings are incorporated herein by reference. In these processes, the catalysts of the present invention show remarkably higher activity and selctivity to product than those heretofore employed, as shown in the accompanying examples.

The alkenediols and alkynediols which are hydrogenated by the catalyst of this invention are defined by the formulae

and

wherein n and n' each have a value of from 1 to 4 and wherein n and n' preferably have a value of one. Aldehydes which are hydrogenated by the present catalyst are defined by the formula

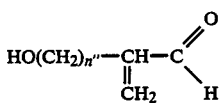

wherein n" has a value of from 1 to 4.

In one embodiment of this invention, the alkynediols are reduced to the corresponding alkenediol by first partially hydrogenating the alkynediol with hydrogen in the presence of between about 2 and about 3 wt % of Raney nickel catalyst at a temperature of from about 40° C. to about 150° C. and a hydrogen pressure of from about 150 psig to about 450 psig at a pH of 6–8. The recovered alkenediol can be further hydrogenated using the present catalyst to the corresponding alkanediol at a higher temperature, e g. about 100° C. to about 250° C. and a pressure of from about 1,000 to about 5,000 psig; preferably at a temperature of between about 110° and about 200° C. and a pressure of from about 1,000 to about 4,000 psig.

Alternatively, the alkanediol can be directly obtained from alkenediol or alkynediol at a temperature of between about 40° C. and about 200° C. and a pressure of from about 1,000 to about 3,000 psig, depending on alkynediol reactant. For conversion of butynediol to butanediol, reaction conditions of 40°–175° C. and pressure of 1,000–3,000 psig are preferred. However, for the conversion of butynediol to butenediol, milder reaction conditions including 45°–65° C. and 200–350 psig are preferred. In the above reactions, the butynediol reactant is usually employed as an aqueous solution of from about 25 wt. % to about 50 wt. % diol concentration.

Having thus generally described the invention reference is now made to the following Examples which illustrate preferred embodiments of the invention but which are not to be construed as unduly limiting to the scope which is discussed above and defined in the appended claims.

EXAMPLE 1

Catalyst Preparation

To a solution containing 112.5 g. of nickel nitrate in 100 ml of water was added 126 grams of 1/16 inch diameter fluted extruded alumina. The mixture was slurried by stirring with a glass rod until the absorption of salt solution ceased (approximately 15 minutes). The supernatant salt solution was decanted and set aside for further use. The alumina containing absorbed nickel nitrate was placed in a vacuum oven and dried at 50° C. for 2 hours, after which it was cooled and then twice dipped in the decanted salt solution to complete the absorption. The catalyst was dried at 125° C. for one hour, then calcined at 400° C. for 15 hours. The resulting product contained 15% nickel in the form of nickel oxide.

To a solution containing 0.75 grams of palladium nitrate and 0.45 grams of perrhenic acid in 50 ml of water, was added the above calcined catalyst. The catalyst was stirred manually until all of the solution of palladium and perrhenic acid was absorbed. The catalyst was dried at 125° C. for one hour and then calcined at 400° C. for 15 hours. This catalyst contained 15% nickel, 0.2% palladium and 0.2% rhenium.

Before use in a hydrogenation reaction, the catalyst is reduced at atmospheric pressure with increasing hydrogen concentration at three temperature stages commencing at 250° C., proceeding to 325° C. and ultimately to 400° C. over a period of 20 hours.

EXAMPLE 2

A catalyst containing 17% nickel, 0.2% palladium and 0.2% rhenium on a 1/16 inch fluted extruded alumina support was prepared as in Example 1 by using 127.5 g of nickel nitrate.

This catalyst was employed in the hydrogenation of a 35% aqueous solution containing a major amount of butanediol, about 4% butenediol and about 3% hydroxybutyraldehyde having a carbonyl number of 18.0. The hydrogenation reaction was conducted by introducing 36 cc (20.5 g) of the catalyst and 500 g of the solution into an autoclave, sealing the autoclave, heating to 140° C. and pressurizing with 2,000 psig hydrogen for 6 hours. After the reaction was complete, the carbonyl number was found to be less than 0.1. The resulting solution was recovered and distilled first at atmospheric pressure to remove water and low boiling organic contaminants and then under 2 mm Hg vacuum through a 12 plate Oldershaw distillation column to recover colorless 1,4-butanediol in 99% yield and purity.

The colorless product was then subjected to separate color tests to determine product quality and stability. The first of these was a Hardy color test where the product was treated with strong $H_2$; $SO_4$ and found to have a low APHA rating of 125. The second was a Toray color test with NaOH and found to have a high, 55% transmission. The third was a Polyester color test where color is developed by heating the product with adipic acid to form a polyester. The polyester test provided an APHA value of 20, which indicated high quality and stability. In addition to these tests the product showed a carbonyl number of 0.2 and was of exceptionally high quality and stability.

EXAMPLE 3

A catalyst containing 17% Nickel, 6% copper and 0.6% manganese was prepared following the general procedure of Example 1 and employing 127.5 g of nickel nitrate, 34.6 g of copper nitrate and 4.75 g of manganese nitrate.

This catalyst was employed in the hydrogenation of the same aqueous solution as employed in Example 2 under the same conditions of operation and amounts of catalyst and solution. After the reaction was completed, the resulting product solution was recovered from the autoclave and subjected to the same distillation at atmospheric pressure and at 2 mm Hg pressure and analyzed in the same manner. This product had a carbonyl number 0.3, a Hardy color of APHA 515, a Toray % transmission of 36% and a polyester color of APHA 25. The higher APHA values and lower % transmission indicate a product having significantly poorer quality and stability than that found in Example 2.

EXAMPLE 4

The catalyst of Example 3 was prepared, except that γ-alumina of ⅛ inch pellet size was substituted for the fluted extruded alumina support. The hydrogenation reaction of Example 3 was repeated with this catalyst and the product, after distillation was found to have a carbonyl number of 0.25, a Hardy APHA color of 880, a Toray % transmission of 26 and a polyester APHA color of 45, indicating a product significantly inferior to that obtained in Example 3.

EXAMPLE 5

A catalyst containing 20% Ni, 0.3% Pd and 0.3% Re on a 1/16 inch extruded fluted alumina was prepared as in Example 1, except that 150.0 g of nickel nitrate, 1.12 g of palladium nitrate and 0.67 g of perrhenic acid were employed.

The hydrogenation reaction of Example 2 was repeated with this catalyst and the product, after distillation was found to have a carbonyl number of 0.1, a Hardy color APHA of 120, a Toray % transmission of 60% and a polyester color APHA of 20.

EXAMPLE 6

A catalyst containing 17% Ni, 0.2% Pd and 0.2% Re was prepared as in Example 1, except that γ-alumina ⅛ inch tablets were substituted for the fluted extruded alumina support. The hydrogenation reaction of Example 2 was repeated with this catalyst and the product, after distillation was found to have a carbonyl number of 0.2, a Hardy color APHA of 150, a Toray % transmission of 50% and a polyester color of 25.

EXAMPLE 7

A catalyst containing 15% Ni, 0.2% Rh and 0.2% Re on γ-alumina ⅛ inch tablets is prepared according to the procedure of Example 1 except that 0.95 g of rhodium nitrate is substituted for palladium nitrate and γ-alumina ⅛ inch pellets are substituted for fluted, extruded alumina. When the hydrogenation reaction of Example 2 is repeated with this catalyst, the product, after distillation has a carbonyl number of 0.2, a Hardy color APHA of 160, a Toray % transmission of 60% and a polyester color APHA of 20.

EXAMPLE 8

The catalyst of Example 1 which has been reduced at atmospheric pressure with increasing hydrogen concentration at three temperature stages, commencing at 250° C. and then proceeding to 325° C. and ultimately to 400° C. for a total of 20 hours is employed in a series of hydrogenation experiments which are conducted in an autoclave employing 20 g of the catalyst and 500 g of a 35% solution of 1,4-butynediol mixture having a carbonyl number of 20.0. The partially hydrogenated 1,4-butynediol is obtained by first partially hydrogenating 1,4-butynediol with hydrogen in the presence of a Raney-type nickel catalyst until the adsorption of hydrogen ceased. The partially hydrogenated 1,4-butynediol is then fed to the autoclave containing the catalyst of Example 1 which has been pre-reduced with hydrogen in the manner described. Hydrogen is then fed to the autoclave under a pressure of 2,500 psig. After a series of hydrogenations at 150° C. the carbonyl numbers from all experiments are less than 0.1 and the physical appearance of the catalyst was excellent, with no fines to be found.

The analysis of 1,4-butanediol product shows less than 0.01% 1,4-butynediol, carbonyl numbers less than 0.1 and the color of the product is water white which, after distillation and exposure to acidic and basic solutions, shows good stability.

EXAMPLE 9

Example 8 is repeated and a 99% conversion of unreacted butynediol to butanediol is obtained.

When other granular support materials, e.g., silica alumina, silica, magnesium silicate, etc. are substituted in Example 1 for γ-alumina the conversion of butynediol to butanediol in the subsequent hydrogenation reaction are similar.

From the above examples, it is apparent that the present catalyst consistently provides an alkanediol product of higher purity and stability than that obtained with the conventional nickel-copper-manganese catalyst.

It is to be understood that the above examples are provided to illustrate specific and preferred embodiments of the invention and that many modifications and alterations can be made in these examples which are within the scope of this invention. For example, barring economics of the catalytic material, higher concentrations of components (a), (b) and (c) as well as variations in component (b) can be employed to provide comparable hydrogenation catalysts and similarly improved products. Also, these catalysts can be employed for many reactions which include the hydrogentation of esters to alcohols or aldehydes to alcohols, alkynediols to alkanediols, and any reactions involving the hydrogen saturation of unsaturated carbon to carbon bonding or saturation of a carbonyl group.

What is claimed is:

1. A supported hydrogenation catalyst comprising:
(a) between about 10 and about 90 wt % of metallic nickel;
(b) between about 0.05 and about 5 wt % of palladuim or rhodium or mixtures thereof and
(c) between about 0.03 and about 10 wt % of metallic rhenium.

2. The catalyst of claim 1 comprising between about 12 and about 25 wt % nickel; between about 0.09 and about 0.6 wt. % palladium or rhodium and between about 0.09 and about 0.6 wt. % rhenium.

3. The catalyst of claim 1 on a suitable support material in a fluted extruded form.

4. The catalyst of claim 1 on a suitable support material wherein the support is crystalline alumina in an amount of between about 5% and about 90% of the total composition.

5. The catalyst of claim 4 wherein a high surface area γalumina support in fluted form is employed.

6. The catalyst of claim 1 wherein said catalyst has a surface area of from about 30 to about 175 m²/g and a pore volume of from about 0.2 to about 1.2 cm³/g.

7. The process for preparing the catalyst of claim 1 which comprises absorbing between about 10% and about 90% by weight of Ni in the form of a nickel salt selected from the group of a nickel nitrate, nickel acetate and nickel carbonate from an aqueous solution on a high surface area support, drying and calcining the resulting nickel salt impregnated support to convert said salt to nickel oxide contacting said supported nickel oxide component with an aqueous solution containing between about 0.05% and about 5% by weight of component (b) in the form of a salt selected from the group of a nitrate, acetate and carbonate and with between about 0.03% and about 10% by weight of a rhenium component in the form of perrhenic acid, rhenium oxide or rhenium acetate, drying and calcining the resulting impregnated support to convert all of the metal compounds to metal oxides and reducing said oxides with hydrogen in a gradually increasing concentration of from a low hydrogen concentration of between about 0.5% to about 10% in an inert diluent to a high hydrogen concentration of up to about 100% under temperature conditions increasing from about 150° C. to about 350° C. for a period of from about 5 to about 12 hours.

8. The process of claim 7 wherein said support is in an extruded, fluted form.

9. The process of claim 7 wherein said support is γ-alumina.

10. The process of claim 7 wherein component (b) is palladium or rhodium.

11. The process of claim 7 wherein component (b) is palladium.

12. The process of claim 11 wherein the calcined nickel oxide supported component is separately contacted with said palladium component and with said rhenium component and drying between contacts with said components.

13. The process of claim 11 wherein the calcined nickel oxide supported component is contacted with a solution of the palladium and rhenium components in admixture.

* * * * *